United States Patent [19]
Doll

[11] Patent Number: 5,018,391
[45] Date of Patent: May 28, 1991

[54] INDUCTIVE FLOW METER

[75] Inventor: Friedhelm Doll, Wermelskirchen, Fed. Rep. of Germany

[73] Assignee: Turbo-Werk Messtechnik GmbH, Cologne, Fed. Rep. of Germany

[21] Appl. No.: 472,755

[22] Filed: Jan. 31, 1990

[30] Foreign Application Priority Data

Feb. 2, 1989 [DE] Fed. Rep. of Germany ....... 3903068

[51] Int. Cl.$^5$ ................................................ G01F 1/60
[52] U.S. Cl. ................................ 73/861.17; 73/861.12
[58] Field of Search ............ 73/861.12, 861.16, 861.17

[56] References Cited

U.S. PATENT DOCUMENTS

| | | | |
|---|---|---|---|
| 3,943,765 | 3/1976 | Takada et al. | 73/861.17 |
| 4,156,363 | 5/1979 | Suzuki et al. | 73/861.16 |
| 4,704,908 | 11/1987 | Blatter | 73/861.17 |

FOREIGN PATENT DOCUMENTS 2054624  5/1972  Fed. Rep. of Germany.
2725026 12/1978  Fed. Rep. of Germany.

Primary Examiner—Charles A. Ruehl
Attorney, Agent, or Firm—Spensley Horn Jubas & Lubitz

[57] ABSTRACT

In an inductive flow meter, the magnetic field generator (11), provided for generating a magnetic field within a tube (10), is connected to a alternating current voltage source via an electronic switch (13). The switch (13) is controlled in such a manner that it becomes conducting only at a zero crossing of the alternating current, respectively, and subsequently remains in the conducting state until the next zero crossing of the exciting current (i) occurs. The useful voltage received at the electrodes (16a, 16b) is integrated in an integrator (19) whereby the noise voltage, coupled into the electrode loop by self-induction, is zero because of $$\int_1^2 \frac{dB}{dt} dt = B_2 - B_1 = 0.$$

17 Claims, 2 Drawing Sheets

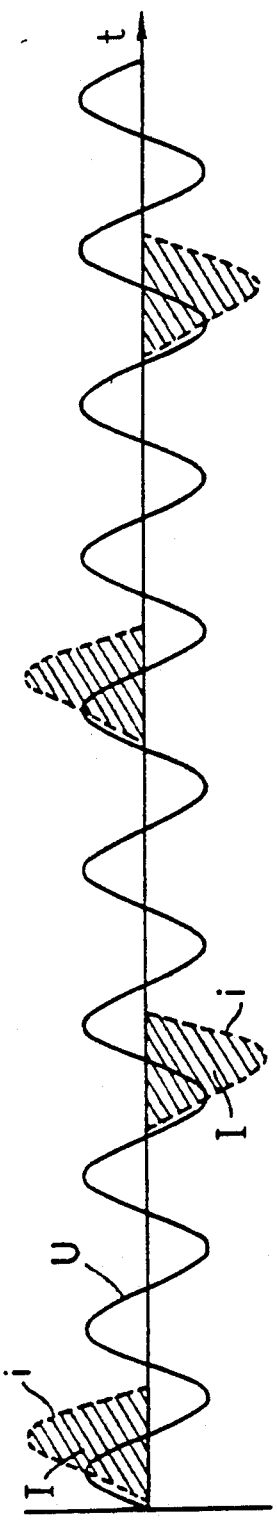
FIG.2a
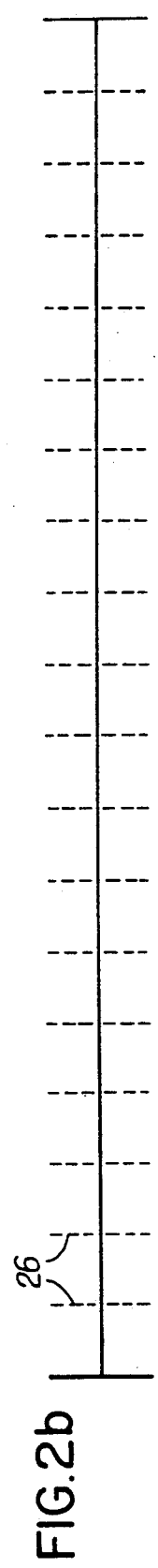
FIG.2b
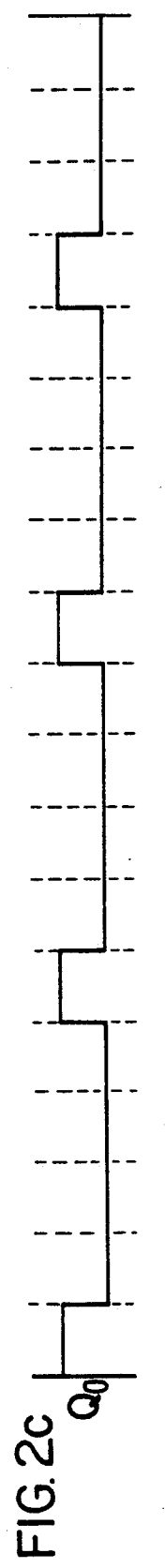
FIG.2c $Q_0$
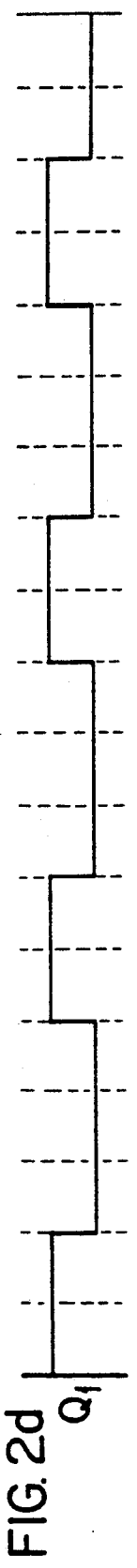
FIG.2d $Q_1$
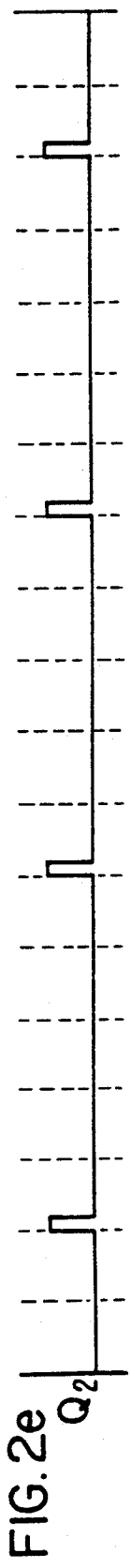
FIG.2e $Q_2$

INDUCTIVE FLOW METER

BACKGROUND OF THE INVENTION

1. Field of the Invention

The invention is directed to an inductive flow meter.

2. Description of Related Art

Inductive flow meters have a magnetic field generator, e.g. a coil, for generating a laterally directed magnetic field in a tube. Further, the tube is provided with two electrodes the voltage of which is supplied to an evaluating circuit. When an electrically conductive liquid is flowing through the tube transversely to the magnetic field, a voltage is generated at the electrodes, the level of this voltage being proportional to the magnetic field strength and to the flow speed.

The first inductive flow meters have been devices operated by alternating fields, wherein the magnetic field generator is connected directly to the voltage of the power supply, for example 220 V/50 Hz.

An advantage of such an alternating-field device resides in that, without requiring too complex switching and control means, a strong magnetic field can be generated so that a large signal amplitide is obtained at the electrodes and thus a large signal-to-noise ratio can be reached. By the comparatively high frequency of the power supply voltage, an inductive flow meter of the described type has a fast response characteristic. However, the systems of alternating-field devices have the inherent disadvantage that the useful signal is subjected to a zero drift. The useful signal generated at the electrodes has a phase-shift of about 90° with respect to the alternating voltage of the power supply. Since the evaluating circuit, along with the lines coming from the electrodes, is very susceptible to interferences, noise voltages originating directly in the power supply voltage as well as self-induced noise voltages are carried into the evaluating circuit. According to usual practice, the noise signals contained in the useful signal are eliminated by phase selection. However, since the phase relation between the noise signal and the useful signal varies with time in dependence of the temperature of the device and other influences, a phase-selective elimination of the noise signals necessitates frequent adjustment and re-adjustment. A further disadvantage consists in a considerable reactive-power consumption of alternating-field devices.

More recent inductive flow meters are operated with a clocked DC-current field. In these flow meters, the magnetic field generator is excited by a clocked DC-current, while the polarity of the DC-current excitation may alternate. Devices of this type have excellent zero stability and low power consumption. Nevertheless, it is a massive disadvantage of these devices that, using electronic means merely to a reasonable extent, only relatively small exciting currents can be generated so that the amplitude of the obtained useful signals is also small. The clock frequency of the clocked DC-current field is comparatively low so that the reaction speed of the flow metering is reduced. Both, the relatively low useful voltage and the low clock frequency, cause a small signal-to-noise ratio.

Further, an inductive flow meter is known from German Patent Application 20 54 624. In this flow meter, the exciter coil generating the magnetic field is contained in a bridge circuit consisting of four electronic switches and being connected to the supply voltage. At each time, two diagonally arranged electronic switches of the bridge circuit are in the conducting state. By switching the pairs of switches, the polarity of the exciter coil can be reversed with respect to the supply voltage. This reversal of polarity is performed respectively at a zero crossing of the alternating current. Since the electronic switches are triacs, they are always extinguished at the zero crossing of the exciting current and then are immediately ignited again. Each of the two pairs of switches remains active over a specific number of periods which is detected by a counter. Then, the other pair of switches is excited. The periodical reversal of polarity of the exciter coil with respect to the supply voltage is provided to compensate those noise voltages which, with respect to their amplitude and their phase length, undergo a slow change over time. The evaluating circuit is provided with a rectifier which receives a phase reference signal and admits only that component of the electrode signal which is in phase with a phase reference signal. Also this arrangement involves the above-mentioned disadvantages of alternating-field devices, i.e. this method has no inherent zero accuracy (autozero).

German Patent Application 27 25 026 discloses also a alternating-field device, wherein the magnetic field exciter is connected to the alternating current voltage via an electronic switch. The electronic switch is clocked by a clock-pulse generator having a fixed clock ratio, the frequency of the clock-pulse generator being a multiple of the supply current frequency. The clock-pulse generator is operated independently of the signals of the evaluating circuit so that the timing of the switch actuation is in no predetermined phase relation to the frequency of the alternating current. The electrode signals, having been amplified, are supplied to sample and hold circuits the output signals of which are subtracted from each other. Also the system of this method does not provide zero accuracy because the noise component, generated by self-induction, is not eliminated by the subtraction.

It is the object of the invention to provide an inductive flow meter which combines the advantages of the device operated by an alternating-field and the devices using a clocked DC-current field without taking on the disadvantages of those two types of devices. This means that the inductive flow meter is to be operated using AC-voltage and without excessive control efforts while, at the same time, avoiding the danger of zero drift, i.e. in this device zero accuracy (autozero) shall be obtained as a feature inherent to the system (and not by compensation or adjustment).

SUMMARY OF THE INVENTION

In the inductive flow meter of the invention, the magnetic field generator is connected to the AC-voltage via an electronic switch. The switch is controlled by a zero crossing detector in such a manner that the exciting current, generating the magnetic field, is switched on at the zero crossing of the AC-voltage. The switch is opened again when the exciting current passes through zero. This is followed by a pause of an adjustable number of half-waves of the AC-voltage, and subsequently the exciting current is switched on as mentioned above.

It is a substantial advantage of the inventive flow meter that the useful signal, which is proportional to the exciting current, need not be freed from noise signals by a critical phase selection but can be obtained by mere integration, with all of the noise signals entering into the evaluating circuit from the outside being eliminated within half a clock period, inclusive of the noise voltages induced by self-induction into the electrode circuit. At the end of a exciting-current pulse, this exciting current has become zero. Thus, at this point of time (or, respectively, a short time afterwards due to existing eddy currents) the magnetic field $B_2$ is equally large as the field $B_1$ at the beginning of the excitation. The useful signal can be obtained by integration of the electrode voltage over one or a plurality of periods of the frequency of the exciting voltage (alternating current voltage). However, the integral over one or a plurality of periods of a power-supply noise voltage is zero, independently of the phase position of this noise voltage. Further, the noise voltage component, coupled into the circuit by self-induction into the electrode loop, due to $B_1=B_2$ (see above) is positively zero in order to obtain also $$\int_1^2 U_{ind}\, dt = \int_1^2 \frac{dB}{dt}\, dt = B_2 - B_1 = 0.$$

This results in that the flow meter of the invention is insensitive to self-induced or externally induced noise voltages. Moreover, according to the relevant teaching, electric transient-oscillation processes lead to a current amplitude and thus also to an amplitude of the field and the useful signal which exceeds the amounts of the quasi-stationary values almost by the factor two.

The inventive flow meter offers the advantages of the alternating-field devices, i.e. a large signal amplitude, because the magnetic field generator is directly connectable (via the electronic switch) to the supply voltage, but avoids the disadvantage of the vagabonding zero point. On the other hand, there is much less control effort required for generating the magnetic field than with flow meters using a clocked DC-current field.

BRIEF DESCRIPTION OF THE DRAWINGS

An embodiment of the invention will be explained hereunder in greater detail with reference to the drawings.

In the drawings

FIG. 2 is a diagram of a plurality of signals occurring in the circuit of FIG. 1.

DESCRIPTION OF THE PREFERRED EMBODIMENT

Figure 1:
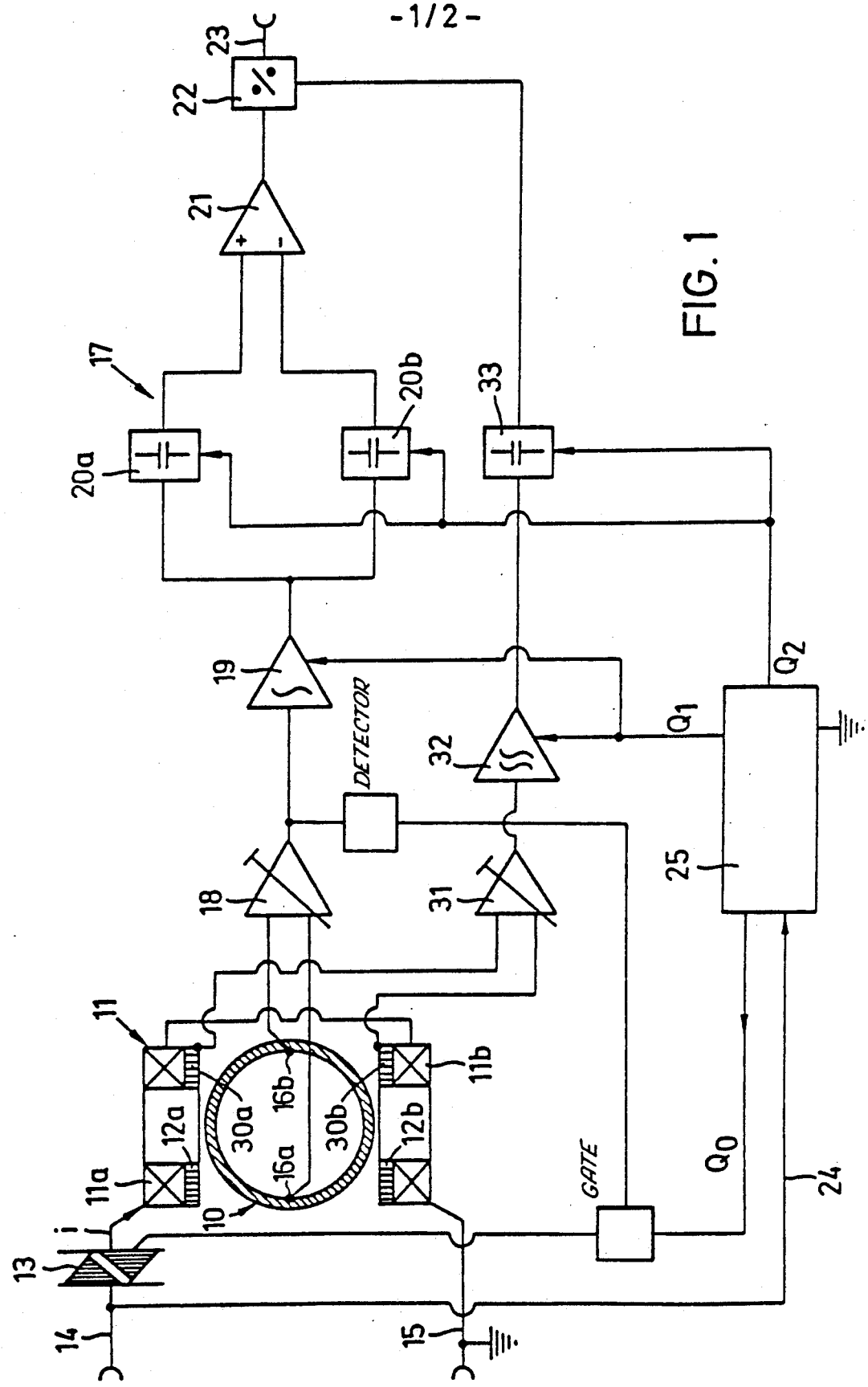
FIG. 1 is a schematic circuit diagram of the inductive flow meter.

The flow meter is provided, in a known manner, with a tube 10 made of a non-conductive material and serving for the passage of a liquid the flow rate of which is to be measured. The tube 10 has the magnetic field generator 11 mounted thereto which, in the present case, consists of two coils 11a and 11b being arranged coaxially to each other at opposite sides of the tube and being connected in series. An exciting current, flowing through the two coils 11a, 11b, generates a magnetic field in the tube 10. This magnetic field extends transversely through the interior of the tube. The magnetic field generator 11 is further provided with reference coils 12a, 12b the function of which will be explained later.

The series connection of the coils 11a and 11b is connected in series with the electronic switch 13 and via lines 14 and 15, to the supply network so that the series arrangement consisting of switch 13 and coils 11a, 11b is directly connectable to the supply network of, for instance, 220 V and 50 Hz.

At opposite positions at the inner wall of the tube 10, there are arranged two electrodes 16a, 16b which are connected to the evaluating circuit 17.

The evaluating circuit 17 includes an amplifier 18 connected to the electrodes 16a, 16b, the signal of the amplifier 18 being transmitted to an integrator 19. The output signal of the integrator 19 is supplied to two sample and hold circuits 20a and 20b having their outputs connected to the two inputs of a difference amplifier 21. The output signal of the difference amplifier 21 is supplied to the counter input of a divider 22. The output signal of the divider circuit 22 at the output 23 is proportional to the flow rate of the liquid within tube 10.

The amplitude of the alternating current voltage in line 14 is supplied, via line 24, to the electronic control means 25. This electronic control means is provided with a zero crossing detector which generates an impulse with each zero crossing of the AC-voltage. In FIG. 2, along the uppermost line a), there is shown the development in time of the AC-voltage, indicated by U, of lines 14 and 15. The vertical markings along line b) represent the needle pulses 26 which, by the zero crossing detector, are generated respectively at the zero crossings of the AC-voltage U.

Along the uppermost line a) of FIG. 2, the development in time of the exciting current flowing through the magnetic field generator 11 is indicated by i. The electronic switch 13, being provided as a triac, is controlled, by the electronic control means 25 and under use of pulses $Q_0$ supplied to the gate of the switch, in such a manner that it is brought into the conducting state with each zero crossing of the AC-voltage. The triac remains in its conducting state until the current i, having a phase shift with respect to the AC-voltage U, has become zero. As known in the art, a thyristor or a triac are controlled to assume the non-conducting state if the main current becomes zero with no control voltage existing at the gate. According to FIG. 2c), the signal $Q_0$ extends over a half-wave of the AC-voltage U. Therefore, the triac can enter the non-conducting state in the subsequent halfwave when the current i becomes zero.

In the present embodiment, the signals $Q_0$, which are supplied to the gate of the triac, are generated respectively after $n=5$ zero crossings of the AC-voltage U so that the current i, since n is an odd number in this case, is generated alternately as a positive and a negative current. If n were an even number, the exciting currents i would be generated to be exclusively unipolar, i.e. with the same polarity. Also in this case the flow meter would work properly. Generally, this operating mode is to be preferred to the bipolar generation of the exciting current i according to FIG. 2(a) because, in this manner, a still better compensation of the noise voltages is possible, i.e. in unipolar operation also the relatively small interferences of the residual induction are eliminated.

In dependence of the zero crossing signals 26, the electronic control means 25 generates the pulses $Q_1$ respresented along line d) of FIG. 2, which pulses $Q_1$ extend over a period of the AC-voltage U, i.e. over a positive and a negative half-wave. Each pulse $Q_1$ starts with that zero crossing of the AC-voltage U at which the triac 13 is controlled to assume the conducting state.

The pulses $Q_1$ drive the integrator 19 in such a manner that the integrator 19 performs integration only for the duration of the pulses $Q_1$ and, subsequently, its output signal is positively reset. Since occurring noise voltages have the frequency of the AC-voltage U (or a multiple thereof), the integral of this noise voltage becomes zero over a full period of the AC-voltage. On the other hand, the integral of the exciting current i within the respective period assumes the value I, the amount of which corresponds to the hatched area in FIG. 2. The useful voltage generated at the electrodes 16a and 16b is in proportion to the area I. At the end of each signal $Q_1$, a value given at the output of the integrator 19 has an amount corresponding to the time integral I of the immediately preceding exciting current i. This output value of the integrator 19, while being clocked by the signal $Q_2$ generated by the electronic control means, is supplied to a sample and hold circuit 20a or 20b. The signal $Q_2$ is a short pulse generated immediately subsequent to termination of the signal $Q_1$. The succession of the signals $Q_2$ is such that alternately one of these signals, respectively, activates the sample and hold circuit 20a and the next signal activates the sample and hold circuit 20b. In this manner, the positive time integrals I, which in the diagram of FIG. 2(a) are arranged above the time axis t, are taken into the sample and hold circuit 20a while the negative time integrals, arranged below the time axis t, are taken into the sample and hold circuit 20b. The function of the sample and hold circuits consists in that, upon occurrence of a pulse $Q_2$, they take over and store the respective output signal of the integrator 19 and keep it stored until occurrence of the subsequent pulse $Q_2$.

The plus input of the difference amplifier 21 is connected to the sample and hold circuit 20a, and the minus input is connected to the sample and hold circuit 20b. Since the value contained in the sample and hold circuit 20b is negative, the values of the two contents of the sample and hold circuits are added by the difference amplifier 21. At the output of the difference amplifier 21, a voltage is generated which is proportional to the voltage between the electrodes 16a and 16b and which, at the same time, depends on the value of the AC-voltage U supplied to the lines 14 and 15.

In order to eliminate the dependence of the output signal from the value of the AC-voltage, an additional coil arrangement, consisting of auxiliary coils 30a and 30b, is provided at the magnetic field generator 11. These auxiliary coils are connected in series with each other and form secondary coils for the coils 11a and 11b. The auxiliary coils 30a and 30b are connected to the inputs of amplifier 31, the output of amplifier 31 being connected to the input of a double integrator 32. The output signal of the double integrator 32 is transmitted to a sample and hold stage 33 having its output connected to the denominator input of divider 22.

The double integrator 32 consists of two integrators, connected in series, the first of them generating the time integral over the voltage induced into the auxiliary coils. This generating of integrals corresponds to the generating of integrals according to $U_N = k \int i \, dt$, with $U_N$ representing the voltage of the useful signal between the electrodes 16a, 16b, k representing a constant and i representing the exciting current. Thus, by the first integrator of the double integrator 32, the voltage at the input of amplifier 18 is imitated. The second integrator of the double integrator 32 has the same function as integrator 19 and is also controlled by the signal $Q_1$.

The sample and hold circuit 33 has the function of the sample and hold circuits 20a and 20b and is also controlled by the signal $Q_2$. This means that the circuits 31, 32 and 33 perform the same signal processing as the usable-signal circuit consisting of the elements 18–21, except, however, for the fact that the voltage at the output of the sample and hold circuit 33 depends exclusively from the value of the AC-voltage supplied to the lines 14 and 15 and not from the flow within tube 10. By the dividing of two voltages in the divider 22, with both of the voltages depending on the value of the AC-voltage, the influence of the alternating current amplitude is eliminated. Thereby, the output signal at line 23 becomes independent from the value of the alternating current.

If no conductive liquid is present between the electrodes 16a and 16b, the exciting current i should be switched off for preventing unnecessary heat-accumulation in the magnetic field generator 11. To this purpose, an auxiliary current source (not shown) is connected to the electrodes 16a and 16b; when no current flows through the electrodes, this auxiliary current source signals this condition to the electronic control means 25. When no electrode current is flowing, the electronic control means 25 effects positive blocking of the switch 13. In this manner, simple switch-off of the magnetic field generator 11 can be accomplished without additional circuit elements.

I claim:

1. An inductive flow meter, comprising:
   a magnetic field generator connectable to an alternating current voltage,
   a pair of electrodes,
   an evaluating circuit connected to said electrodes,
   a control circuit provided with a zero crossing detector for detecting the zero crossings of the alternating current voltage, and
   an electronic switch connecting the magnetic field generator to the alternating current voltage, which electronic switch is controlled by the control circuit in such a manner that it becomes conducting only at a zero crossing of the alternating current voltage and is switched out at a zero crossing of the exciting current,
   characterized in that the electronic switch supplies the alternating current voltage to the magnetic field generator each time for less than one period length and that the evaluating circuit includes an integrator which, starting with the conducting state of the switch, integrates the electrode voltage over one period length of the alternating current or a multiple thereof.

2. The inductive flow meter according to claim 1, wherein the electronic switch is controlled to assume the conducting state at each n-th zero crossing of the alternating current voltage, n being an adjustable integer larger than 1 and preferably larger than 2.

3. The inductive flow meter according to claim 1, wherein the electronic switch is controlled to assume the conducting state at each n-th zero crossing of the alternating current voltage, n being an odd number or an even number.

4. The inductive flow meter according to claim 3, wherein n is an odd number and wherein there are provided a first sample and hold circuit for receiving the positive output signals of the integrator and a second sample and hold circuit for receiving the negative output signals of the integrator, the sample and hold circuits storing the respective time integral of the directly preceding exciting current, and wherein a difference former is provided for generating the difference between the stored signals of the two sample and hold circuits.

5. The inductive flow meter according to claim 1, wherein a detector for detecting the presence of liquid between the electrodes positively locks the electronic switch if no liquid is present.

6. The inductive flow meter according to claim 1, wherein the electronic switch is a triac or a thyristor.

7. The inductive flow meter according to claim 1, wherein there is provided at least one auxiliary coil which is magnetically coupled to the magnetic field generator, the output signal of the auxiliary coil being supplied to a double integrator, and wherein a divider divides the output signal of the integrator by that of the double integrator so as to generate the output signal of the evaluating circuit.

8. An inductive flow meter, comprising:
a magnetic field generator,
a pair of electrodes,
a switch for connecting the magnetic field generator to a source of alternating current voltage, whereby the alternating current voltage is supplied to the magnetic field generator and an exciting current is supplied to the magnetic field generator,
a control circuit, the control circuit including a zero crossing detector for detecting a zero amplitude of the alternating current voltage, means for bringing the switch to a conductive state at a zero amplitude of the alternating current voltage, and means for bringing the switch to a non-conductive state at a zero amplitude of the exciting current,
means for controlling the switch to supply the alternating current voltage to the magnetic field generator for a duration less than a period of the alternating current voltage, and
an evaluating circuit connected to the pair of electrodes, the evaluating circuit including an integrator for integrating a voltage at the electrodes over a period of time beginning when the switch is brought to the conductive state and corresponding to at least a period of the alternating current voltage.

9. The inductive flow meter according to claim 8, wherein the switch is brought to a conductive state after the alternating current voltage has reached zero amplitude n number of times, where n is equal to an integer larger than 1.

10. The inductive flow meter according to claim 8, wherein the switch is brought to a conductive state after the alternating current voltage has reached zero amplitude n number of times, where n is equal to an integer larger than 2.

11. The inductive flow meter according to claim 8, wherein the switch is brought to a conductive state after the alternating current voltage has reached zero amplitude n number of times, where n is equal to an odd integer.

12. The inductive flow meter according to claim 8, wherein the switch is brought to a conductive state after the alternating current voltage has reached zero amplitude n number of times, where n is equal to an even integer.

13. The inductive flow meter according to claim 8, further comprising detection means for detecting the presence of liquid between the electrodes and for locking the switch if the presence of liquid between the electrodes is not detected.

14. The inductive flow meter according to claim 8, wherein the switch comprises a triac.

15. The inductive flow meter according to claim 8, wherein the switch comprises a thyristor.

16. The inductive flow meter according to claim 8, wherein the integrator generates positive output signals and negative output signals corresponding to the time integral of the exciting current, comprising:
a first sample and hold circuit for receiving and storing the positive output signals of the integrator,
a second sample and hold circuit for receiving and storing the negative output signals of the integrator, and
a difference generator for generating a signal corresponding to a difference between the signal stored by the first sample and hold circuit and the signal stored by the second sample and hold circuit.

17. The inductive flow meter according to claim 8, wherein the integrator generates an output signal, comprising:
an auxiliary coil for generating an output signal, the auxiliary coil being magnetically coupled to the magnetic field generator,
a double integrator,
means for supplying the output signal of the auxiliary coil to the double integrator, and
a divider for dividing the output signal of the integrator by the output signal of the double integrator to thereby generate an output signal of the evaluating circuit.

* * * * *